Nov. 2, 1948.                    R. J. TEETSELL                    2,452,614
                              ELECTRICAL TEST CIRCUIT
Filed Feb. 14, 1944                                           2 Sheets-Sheet 2

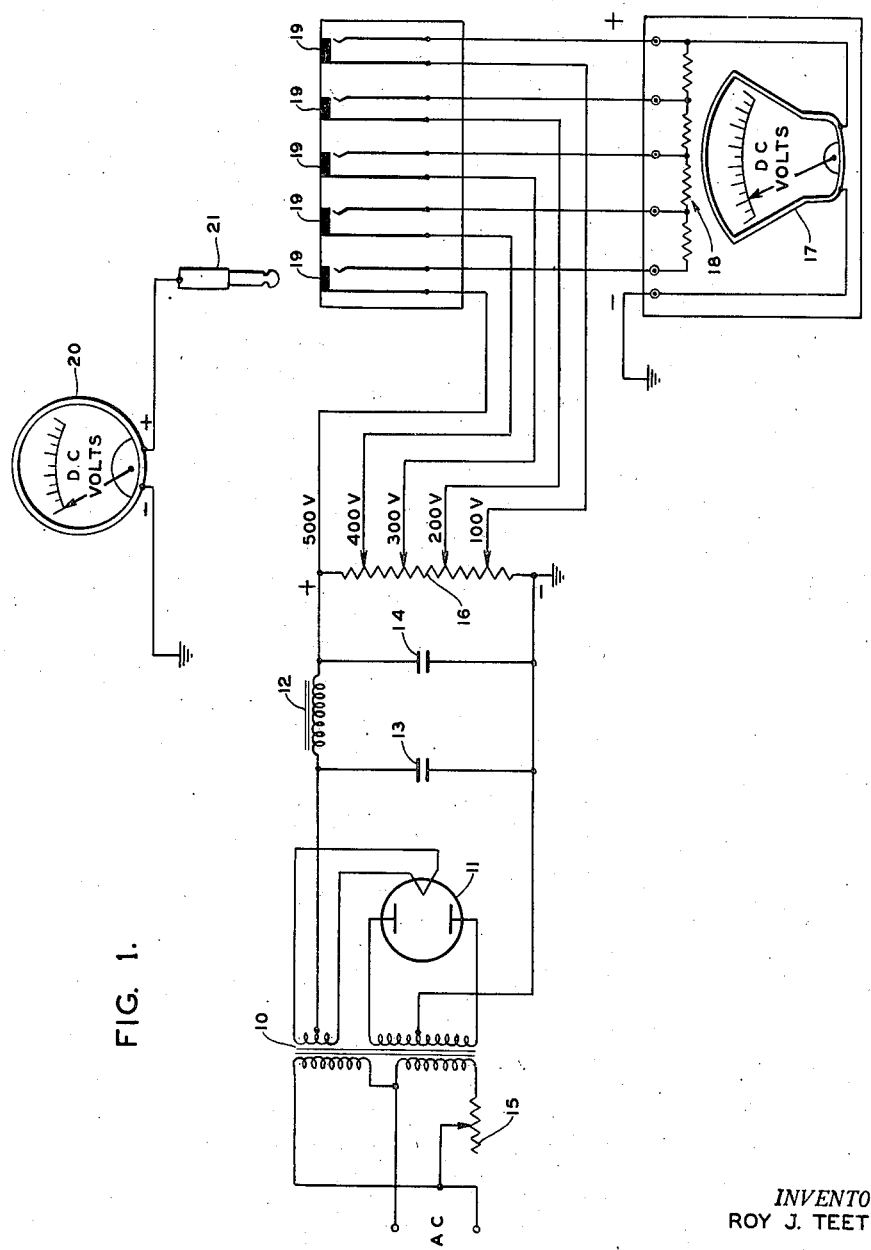

INVENTOR.
ROY J. TEETSELL
BY
William D. Hall.
ATTORNEY.

Patented Nov. 2, 1948

2,452,614

UNITED STATES PATENT OFFICE 2,452,614

ELECTRICAL TEST CIRCUIT

Roy J. Teetsell, Red Bank, N. J., assignor to the United States of America as represented by the Secretary of War Application February 14, 1944, Serial No. 522,291

2 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical meter circuits and more particularly to circuit arrangements protecting electrical meter standards against damage due to the application of overloads.

A known system in wide use for the checking and calibration of electrical meters is the comparison method, wherein a source of energy is imposed simultaneously upon a meter under test and a standard meter of high accuracy. By the disparity in readings between the meter under test and the standard meter, the percentage of error of the former may be calculated, and a correction may be effected in the shunt or series resistor associated with said meter.

In one of the typical meter test instruments of this character heretofore used, a source of alternating and direct current of diverse potentials is provided which is made available at terminal posts. Means are also provided for varying the potentials at the terminals. Associated with the power supply are multi-range A. C. and D. C. standard meters, which are connectable to suitable values of potential at the terminals by means of cords. If, for example, a D. C. voltmeter is being tested, the procedure is to parallel the meter under test across a standard D.-C. multi-range voltmeter which is set to conform to the rated range of the device under test. The standard meter cord is then attached to the terminals which furnish the required test potential and the necessary test operations are performed.

In the event, however, the meters are inadvertently attached to the improper terminals and an overload is applied, both meters may be damaged to an extent depending on the severity of the overload. To avoid this occurrence, the test operator must exercise great caution, a requirement which is undesirable in large scale testing employing semi-skilled personnel or in the performance of tests under military field conditions.

While the meter under test may contain a series fuse as a protective device, the standard meter cannot incorporate such a device without affecting the accuracy of the instrument. Hence, it is necessarily exposed to overload potentials. Moreover, the standard meter, being of precision design, is an expensive instrument and its damage constitutes a considerable loss.

Accordingly, it is the principal object of the invention to provide a meter testing circuit employing a standard meter, which circuit precludes the possibility of overloading the standard meter irrespective of any error committed by the test operator.

It is a further object of my invention to provide a protective arrangement for meter testing devices entailing standard meters, which arrangement is applicable to test devices for A. C. or D. C. voltmeters or ammeters or any combination thereof.

It is a still further object of the invention to provide a circuit of the above type which is of simple and practicable design.

In practicing my invention, I utilize the same components as were hereinabove described in connection with the meter test instrument, namely, a power supply, and multi-range standard meters. However, the terminal posts previously used in conjunction with the power supply are supplanted by open circuit jacks. Instead of connecting the standard meter to the power source only during the interval in which a meter is being subjected to tests, as was heretofore the practice, the circuit is arranged so that each range of the standard meter is pre-wired in series with the open circuit jacks to an equivalent range of potentials. The circuit is connected in a manner whereby, in order to apply potential to a particular range of the standard meter, it is necessary to close its associated jack by inserting a plug. In testing a meter, one lead is connected to common ground, and the other lead is connected to the plug. By inserting the plug into what is believed to be the proper potential for the meter under test, the circuit is simultaneously completed for the standard meter and the meter under test. Regardless of where the plug is inserted, only the correct voltage will be applied to the standard meter, although the same voltage may be of an improper and overload value for the meter under test. Thus, it may be seen that while the meter under test may be damaged or blown by an inadvertence or mistake on the part of the test operator, in any case the standard meter is completely protected. Obviously, the damage incurred by the relatively inexpensive commercial meter is to be preferred to the impairment of costly standard meters.

Other aims and advantages of the invention will appear in the specification when considered in connection with the accompanying drawing wherein:

Figure 1 is a schematic circuit diagram of an embodiment of my invention as applied to the testing of D.-C. voltmeters;

Figure 3:
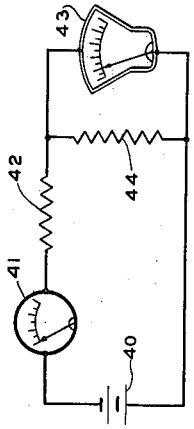
Figure 3 is a simplified circuit diagram embodying the invention.

Referring now to Figure 1, a conventional full wave rectifier is shown comprising a transformer 10, a full wave rectifier vacuum tube 11, a filter choke 12, and filter capacitors 13 and 14. The transformer 10 combines a high voltage section and a low voltage section and, in series with the primary of the high voltage section is a variable resistor 15 which serves by varying the input A.-C. voltage to control the D.-C. output of the power supply. A tapped bleeder resistor 16 is shunted across the output of the power supply and the taps are arranged so that the voltages available at the tap terminals range between 0–100, 0–200, 0–300, 0–400, and 0–500, depending upon the adjustment of variable resistor 15.

A multi-range standard D.-C. voltmeter 17 of high accuracy is provided, having a bank of multiplier resistors 18 in series with the positive terminal which enables the meter scale to measure voltage ranges from 0–100, 0–200, 0–300, 0–400, and 0–500. The negative terminal of the standard meter 17 is grounded, as is the negative side of the power supply. Each range terminal on standard meter 17 is connected to its respective voltage tap of the power supply through an open circuit jack 19 so that in the absence of a shorting plug, the circuit is normally open.

If a D.-C. voltmeter 20 is to be tested, the negative terminal of the meter is grounded and the positive terminal is connected to a shorting plug 21. Assuming that the meter 20 range is 0–200 volts, the plug is inserted in the jack 19 associated with the 0–200 range of the standard meter 17 and the power supply. The insertion of the plug 21 completes the connection of the 200-volt tap to the standard meter 0–200 range and applies the same voltage to meter 20. The readings of standard meter 17 and meter 20 may then be compared throughout the scale range by varying resistor 15. If, due to carelessness on the part of the operator, the plug is inserted in the 0–500-volt jack, the circuit between the 0–500 range of the standard meter 17 and the 500-volt tap is completed and the same voltage is applied to the meter 20. The resultant overload on meter 20 has no effect on standard meter 17, which is fully protected by the circuit.

Figure 2:
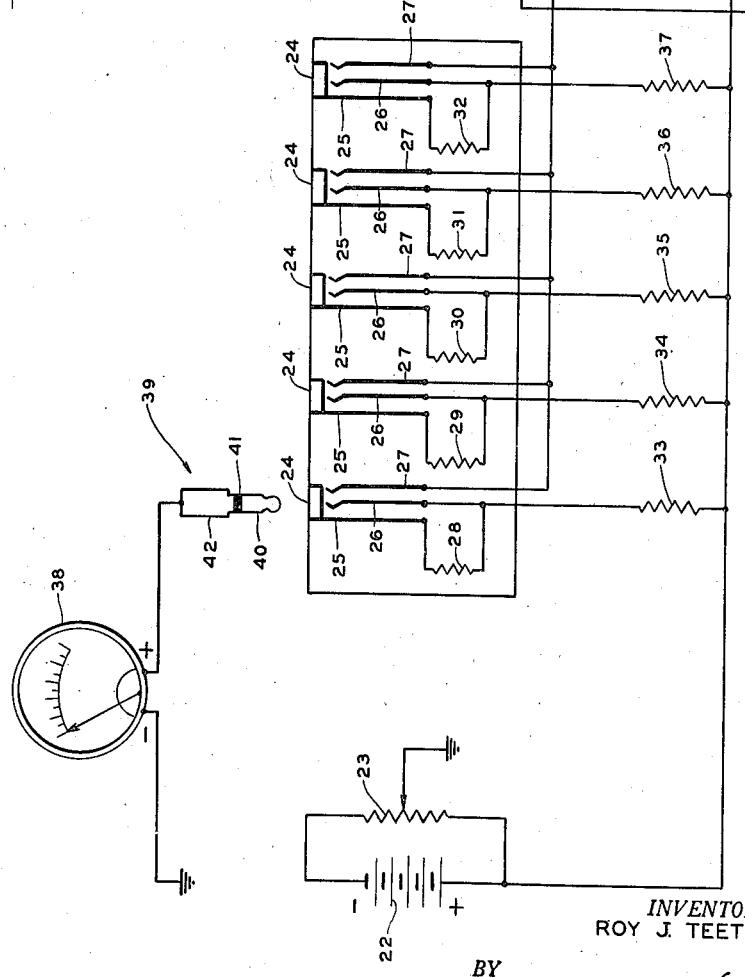
Figure 2 is a schematic circuit diagram of an embodiment of my invention as applied to the testing of D.-C. ammeters.

Referring now to Figure 2 of the drawing, a circuit arrangement is illustrated for the testing of D.-C. ammeters, wherein an ammeter under test is serially connected with a standard multi-range ammeter for the purpose of securing comparative readings.

Energy for the circuit is provided by a battery 22, having a potentiometer 23 shunted thereon. The positive terminal of the battery is connected to the positive terminal of a standard ammeter 24, while the sliding arm of the potentiometer 23 is grounded.

A set of 5 three-terminal, open-circuit jacks 24 is shown, each comprising a supporting arm 25 and a pair of flexible contacts 26 and 27. Connected between the arms 25 and contacts 26 of jacks 24 are 5 current-limiting resistors 28, 29, 30, 31, and 32, of various values. Connected between the flexible contacts 26 of jacks 24 and the positive terminal of the standard meter 24 are a group of 5 external shunts 33, 34, 35, 36, and 37, of various values. The ohmic value of the respective shunts 33, 34, 35, 36, and 37 is such as to adapt the standard meter 24 to the measurement of milliamperes in ranges of 0–100, 0–200, 0–300, 0–400, 0–500, when connected across the meter.

The milliammeter 38 under test has its negative terminal grounded and its positive terminal connected to a plug 39. The plug 39 comprises a shank section 40 which is insulated from the handle section 42 by a Bakelite washer 41. The handle section 42 is connected to the positive terminal of meter 38. When the plug 39 is inserted into one of the jacks 24, the shank section is interposed and in electrical connection with the contacts 26 and 27, thereby shorting the contacts and completing the connection between an external shunt, that is, either 33, 34, 35, 36, or 37, and standard meter 24. The handle section 42 of the plug 39 makes contact with the arm 25 of the jack 24, so that battery 22 is now connected in series with meter 38 and a current-limiting resistor, viz., either 28, 29, 30, 31, or 32, to the standard meter 24, and the circuit is thereby completed.

The electrical circuit of Figure 2, after insertion of plug 39 in one of jacks 24, may be further elucidated by reference to Figure 3, in which the power source is designated by battery 40, the meter under test by 41, the current-limiting resistor by 42, the standard meter by 43, and the external meter shunt by 44. When, in Figure 2, the plug 39 is set in one of the jacks 24, the shunt 44 is connected across standard meter 43, which is then connected to the power source 40 in series with resistor 42 and meter under test 41. Meter 41 and meter 43 carry the same intensity of current, and may consequently be compared in their measurements.

The ohmic value of current-limiting resistors 28, 29, 30, 31, and 32 is such that when potentiometer 23 is positioned at maximum potential, and the resistance of the meter under test 38 is assumed to be zero ohms, the current in the standard meter circuit does not more than moderately exceed the maximum reading of the standard meter 24 as determined by the particular shunt imposed across the meter when plug 39 is inserted.

If, for example, meter 38 is a 0–300 range milliammeter and is subjected to test, the procedure is to insert the plug 39 in the jack 24 associated with resistor 30 and shunt 35. Shunt 35 adapts standard meter 24 to a 0–300 milliampere range scale, and the ohmic value of resistor 30 limits the current in the test circuit to 320 milliamperes with maximum battery 23 voltage. Since 320 milliamperes is well within the overload safety tolerance of standard meter 24, the standard meter 24 is not endangered. It is not feasible to limit the current to precisely the range of standard meter 24, inasmuch as the resistance of meter 38 is not known or of the same value for any two meters.

In the event that plug 39 is inserted in the jack 24 associated with the 0–500 milliampere range, the effect is to render the 0–500 milliampere scale of the standard meter operative and at the same time to apply a heavy overload to the meter under test 38, whose rated scale is 0–300 milliamperes.

In actual practice the power supply and the standard meters are enclosed in a unitary housing, while the jacks, power-adjusting dials and switches are made accessible on a Bakelite or metal panel. Accordingly, the test operator is unable to alter the connection to the standards and the consequences of his mistakes are suffered only by the meter under test.

The protective circuit arrangements and principles illustrated in Figures 1 and 2 may be readily adapted to any testing device entailing the use of multi-range standard meters, whether A. C. or D. C., ammeter, voltmeter, or any combination thereof.

While I have illustrated specific embodiments of my invention, it will be understood that this is by way of illustration only and that various changes and modifications may be made within the contemplation of my invention and under the scope of the following claims.

I claim:

1. A circuit arrangement for the comparison testing of a multi-range standard ammeter with an ammeter of undetermined accuracy comprising in combination a standard ammeter including a plurality of shunts, an ammeter under test, a source of energy, a plurality of current-limiting resistors, means for simultaneously connecting one of said shunts across said standard ammeter and connecting said source of energy with said standard ammeter in series with one of said resistors and said ammeter under test whereby both said standard ammeter and said ammeter under test are energized, each of said resistors being proportional to each corresponding shunt to limit maximum energization of said standard ammeter to values which do not appreciably exceed those corresponding to full scale deflection of the standard ammeter.

2. A circuit arrangement for the comparison testing of a multi-range standard ammeter with an ammeter of undetermined accuracy comprising in combination, a standard ammeter including a plurality of shunts, an ammeter under test, a source of energy, means for controlling the magnitude of said energy, a like plurality of three-terminal open-circuit jacks, having two of said terminals in series connection with said shunts and said standard ammeter, a like plurality of current-limiting resistors connected between the third of said jack terminals and one of the other of said terminals, said current limiting resistors each having a value relative to the corresponding ammeter shunt such that the maximum standard ammeter energization does not appreciably exceed that corresponding to full scale deflection, a plug having means for shorting said two of said jack terminals and means for establishing electrical contact with said third of said jack terminals, means for connecting said source of energy to said standard in series with said ammeter under test and said contact means of said plug whereby when said plug is inserted in one of said jacks one of said shunts is connected across said standard ammeter and said energy is imposed upon said standard ammeter in series with said ammeter under test and one of said current limiting resistors.

ROY J. TEETSELL.

REFERENCES CITED

The following references are of record in the file of this patent:

UNITED STATES PATENTS

| Number | Name | Date |
|---|---|---|
| 1,378,454 | Hentschel | May 17, 1921 |
| 1,587,841 | Knopp | June 8, 1926 |